United States Patent [19]

Sterzel et al.

[11] 4,229,553
[45] Oct. 21, 1980

[54] STABILIZED POLY(ALKYLENE TEREPHTHALATE) MOLDING MATERIALS

[75] Inventors: Hans-Josef Sterzel, Dannstadt-Schauernheim; Rolf Wurmb, Heidelberg; Franz Schmidt, Mannheim; Erhard Seiler, Ludwigshafen, all of Fed. Rep. of Germany

[73] Assignee: BASF Aktiengesellschaft, Fed. Rep. of Germany

[21] Appl. No.: 57,130

[22] Filed: Jul. 12, 1979

[30] Foreign Application Priority Data

Aug. 3, 1978 [DE] Fed. Rep. of Germany ....... 2834032

[51] Int. Cl.$^2$ ............................................. C08L 63/00
[52] U.S. Cl. ................................. 525/438; 260/22 EP
[58] Field of Search ......................................... 525/438

[56] References Cited

U.S. PATENT DOCUMENTS

| | | | |
|---|---|---|---|
| 3,560,605 | 2/1971 | Siggel | 525/438 |
| 3,621,074 | 11/1971 | Siggel | 525/438 |
| 3,886,104 | 5/1975 | Borman | 525/438 |
| 3,909,485 | 9/1975 | Hongo | 525/438 |
| 3,965,212 | 6/1976 | Kamada | 525/438 |
| 4,010,219 | 3/1977 | Aoyama | 525/438 |
| 4,020,122 | 4/1977 | Borman | 525/438 |
| 4,035,333 | 7/1977 | Kamada | 525/438 |
| 4,101,601 | 7/1978 | Thomas | 525/438 |
| 4,141,882 | 2/1979 | Kodama | 525/438 |
| 4,147,737 | 4/1979 | Sein | 525/438 |

FOREIGN PATENT DOCUMENTS 1525331  9/1978  United Kingdom .

*Primary Examiner*—Paul Lieberman
*Attorney, Agent, or Firm*—Keil & Witherspoon

[57] ABSTRACT

Poly(alkylene terephthalate) molding materials which contain, as the stabilizer, a diepoxide of molecular weight from 200 to 2,000, and a catalyst which is an alkali metal salt of a chelating agent possessing one or more —N(CH$_2$—COO$^-$)$_2$ groups in the molecule. Preferred catalysts are trisodium nitrilotriacetate and tetrasodium ethylenediaminetetraacetate. The molding materials may be used for the manufacture of moldings, films, monofilaments and fibers.

6 Claims, No Drawings

STABILIZED POLY(ALKYLENE TEREPHTHALATE) MOLDING MATERIALS

The present invention relates to a poly(alkylene terephthalate) molding material which contains a diepoxide compound as the stabilizer, as well as a catalyst.

Poly(alkylene terephthalates) can be injection-molded to give a variety of moldings, and be extruded to give sheets, films, monofilaments and fibers. The materials are processed at from 270° to 300° c. in the case of poly(ethylene terephthalate) and at from 240° to 280° C. in the case of poly(butylene terephthalate). At these temperatures, molecular degradation occurs to a greater or lesser degree, depending on the residence time, and this degradation results in deterioration of the mechanical properties.

A plurality of proposals exist for reducing or entirely preventing this thermal molecular degradation. One of the more successful appears to be the method wherein the carboxyl end groups formed by the degradation are linked to one another by diepoxides, thereby preventing the decrease in molecular weight. For example, U.S. Pat. No. 4,020,122 discloses a process for increasing the melt elasticity of linear polyester resins by addition of an organic compound which possesses at least two epoxide groups.

In many cases, however, the rate of reaction between the carboxyl end groups and the diepoxides is too low to achieve a sufficient effect. Hence, attempts have been made to accelerate this reaction by catalysts. British Pat. No. 1,525,331 proposes amine compounds and ammonium compounds, and U.S. Pat. No. 4,101,601 proposes phosphonium halides, as catalysts for this purpose.

However, on closer examination it is found that in the case of the tertiary amines described the rate of reaction between carboxyl groups and diepoxides is only increased insignificantly—at least in the case of molding materials not reinforced with glass fibers—and that in addition there is a deterioration in color. In the case of the phosphonium halides, a substantially increased discoloration of the molding materials also results.

It is an object of the present invention to provide catalysts which accelerate the reaction between carboxyl groups and diepoxides in the desired manner without causing a deterioration in color of the molding materials. We have found that this object is achieved, according to the invention, by adding from 0.01 to 0.5% by weight, preferably from 0.01 to 0.2% by weight, based on the molding material, of an alkali metal salt of a chelating agent which possesses one or more $-N(CH_2COO^-)_2$ groups in the molecule.

Accordingly, the stabilizers are preferably compounds of the general formula $R-N(CH_2-COO^-)_2$, where R is $-CH_2-COO^-$, alkyl, cycloalkyl or aralkyl, which may in turn be substituted by $-N(CH_2-COO^-)_2$ or $-N(CH_2-COOH)_2$. The preferred alkali metal is sodium, but potassium or lithium salts may also be employed.

Particularly preferred catalysts are trisodium nitrilotriacetate, disodium and tetrasodium ethylenediaminetetraacetate, disodium uranildiacetate and disodium and tetrasodium 1,2-diaminocyclohexanetetraacetate.

Suitable poly(alkylene terephthalates) are, in particular, poly(ethylene terephthalate) and poly(butylene terephthalate), and not only the homopolyesters but also copolyesters which contain small amounts (preferably in each case up to 10 mole%) of other dicarboxylic acids, eg. naphthalenedicarboxylic acid, isophthalic acid or adipic acid, or other diols, such as ethylene glycol, propylene glycol, butanediol or hexanediol, may be employed. The relative viscosity of the polyesters employed (measured at 23° C. in a 1:1 mixture of phenol and ortho-dichlorobenzene at a concentration of 0.5 g/100 ml) is preferably from 1.3 to 1.8.

The molding materials contain from 0.1 to 3.0, preferably from 0.2 to 1.0, % by weight of a diepoxide compound as the stabilizer. Examples of suitable diepoxides are 1,4-dimethylol-cyclohexane diglycidyl ether, bis-(3,4-epoxycyclohexylmethyl) adipate, epoxidized novolacs and epoxidized soybean oil. The diglycidyl ethers of bisphenol A, which can be prepared by reacting bisphenol A with epichlorohydrin in the molar ratio of from 1:2 to 1:1.1, are preferred.

The poly(alkylene terephthalate) molding materials of the invention may contain conventional additives, eg. pigments, nucleating agents, stabilizers, mold release agents and flameproofing agents, as well as reinforcing fillers, eg. glass fibers, glass beads, talc, kaolin or chalk.

The catalyst according to the invention and the diepoxide, with or without the additives, are introduced into the poly(alkylene terephthalate) by conventional methods, using an extruder or other mixing apparatus, the poly(alkylene terephthalate) being intimately mixed with the added substances above its melting point.

The addition of the catalysts according to the invention greatly reduces the decrease in the molecular weight during processing and hence extends the temperature range and range of residence times available for processing. Furthermore, the yellowish to yellow intrinsic color resulting from the epoxide additive is greatly diminished.

In the Examples, parts and percentages are by weight.

EXAMPLE 1

Poly(ethylene terephthalate) having a relative viscosity of 1.57 was mixed at 280° C. with 0.1% of talc as a nucleating agent, and with 0.6% of bisphenol A diglycidyl ether and various catalysts, using a twin-screw extruder. The extruded strands were passed through a waterbath and granulated. The granules were dried until the water content was less than 0.02% (12 hours under reduced pressure at 120° C.).

To assess the processing stability, standard bars of size 4×6×50 mm, according to DIN 53,453, were produced on an injection-molding machine at 270° C. and 300° C., the mold temperature being 140° C. In order to expose the melt to heat for a particularly long time, the cycle time of the injection-molding machine was set to 100 seconds. The decrease in relative viscosity is a measure of the stability of the poly(alkylene terephthalate). The smaller the decrease in relative viscosity with increasing melt temperature, the more stable is the polyester. The relative viscosity was measured on 0.5% strength solutions in a solvent mixture of phenol and o-dichlorobenzene in the weight ratio of 3:2, at 25° C. The notched impact strength is also a very sensitive indication of molecular weight decrease. Based on the flexural impact test, according to DIN 53,453, the notched impact strength was determined as follows: holes of 3 mm diameter were drilled in the center of the 6×50 mm surface of the standard bars. The work (in kilojoule per m²) performed when the hammer of the impact pendulum strikes the surface and breaks the test specimen was determined by means of a pendulum impact tester. The lower the decrease in notched impact strength with increasing processing temperature, the more stable is the poly(alkylene terephthalate).

Table 1, which lists the test results, also gives a visual assessment of color. The Table uses the following abbreviations:
THA: tri-2-ethylhexylamine
TPP: triphenylphosphine
NTA: trisodium nitrilotriacetate
EDTA: tetrasodium ethylenediaminetetraacetate

TABLE 1

| Experiment | a | b | c | d | e | f |
|---|---|---|---|---|---|---|
| Diepoxide, % | — | 0.6 | 0.6 | 0.6 | 0.6 | 0.6 |
| Catalyst, % | — | — | 0.1 THA | 0.1 TPP | 0.1 NTA | 0.1 EDTA |
| Rel. viscosity | | | | | | |
| Granules | 1.51 | 1.52 | 1.50 | 1.45 | 1.53 | 1.54 |
| Molding, 270° C. | 1.48 | 1.48 | 1.46 | 1.43 | 1.50 | 1.51 |
| Molding, 300° C. | 1.33 | 1.34 | 1.32 | 1.30 | 1.43 | 1.44 |
| Notched impact strength | | | | | | |
| Specimen produced at 270° C. | 29 | 30 | 28 | 25 | 32 | 32 |
| Specimen produced at 300° C. | 12 | 14 | 13 | 10 | 24 | 24 |
| Color | greyish white | yellow | yellow | deep yellow | greyish white | greyish white |

Experiments e and f are in accordance with the invention

EXAMPLE 2

Using a similar method to Example 1, poly(butylene terephthalate) having a relative viscosity of 1.67 was stabilized with the diepoxide and various catalysts, the additives being incorporated at 250° C. The relative viscosity was measured after processing at 260° and 290° C., the mold temperature being 60° C. The results are shown in Table 2.

TABLE 2

| Experiment | a | b | c | d | e | f |
|---|---|---|---|---|---|---|
| Diepoxide, % | — | 0.6 | 0.6 | 0.6 | 0.6 | 0.6 |
| Catalyst, % | — | — | 0.1 THA | 0.1 TPP | 0.1 NTA | 0.1 EDTA |
| Rel. viscosity | | | | | | |
| Granules | 1.62 | 1.63 | 1.60 | 1.59 | 1.65 | 1.65 |
| Molding, 260° C. | 1.59 | 1.62 | 1.58 | 1.57 | 1.63 | 1.64 |
| Molding, 290° C. | 1.42 | 1.48 | 1.46 | 1.47 | 1.57 | 1.58 |
| Notched impact strength | | | | | | |
| Specimen produced at 260° C. | 61 | 62 | 55 | 56 | 65 | 64 |
| Specimen produced at 290° C. | 17 | 34 | 30 | 29 | 49 | 48 |
| Color | white | yellow | yellow | deep yellow | white | white |

Experiments e and f are in accordance with the invention

We claim:

1. A poly(alkylene terephthalate) molding material which contains, as the stabilizer, from 0.1 to 3.0 percent by weight of a diepoxide of molecular weight from 200 to 2,000, as well as a catalyst, wherein the catalyst consists of from 0.001 to 0.5 percent by weight, based on the molding material, of an alkali metal salt of a chelating agent which possesses one or more —N(CH$_2$—COO$^-$)$_2$ groups in the molecule.

2. A poly(alkylene terephthalate) molding material as claimed in claim 1, wherein the catalyst is trisodium nitrilotriacetate.

3. A poly(alkylene terephthalate) molding material as claimed in claim 1, wherein the catalyst is tetrasodium ethylenediaminetetraacetate.

4. A molding material as claimed in claim 1, wherein the poly(alkylene terephthalate) is poly(ethylene terephthalate).

5. A molding material as claimed in claim 1, wherein the poly(alkylene terephthalate) is poly(butylene terephthalate).

6. A poly(alkylene terephthalate) molding material as claimed in claim 1, wherein the diepoxide is a diglycidyl ether of bisphenol A.

* * * * *